(12) United States Patent
Kim

(10) Patent No.: US 6,376,931 B1
(45) Date of Patent: Apr. 23, 2002

(54) PORTABLE COMPUTER HAVING POWER SUPPLY SYSTEM PERFORMED BY DETACHMENT OF BATTERY PACK

(75) Inventor: Do-Seong Kim, Kyunggi-do (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 0 days.

(21) Appl. No.: 09/450,702

(22) Filed: Nov. 30, 1999

(30) Foreign Application Priority Data

Nov. 30, 1998 (KR) ............................................. 98-51980

(51) Int. Cl.[7] .................................................. H02J 9/04
(52) U.S. Cl. ........................ 307/64; 307/150; 713/323; 713/324; 710/103
(58) Field of Search ............................ 307/125, 64, 66, 307/150; 713/320, 340, 323, 324; 361/683; 710/101, 102, 62, 103

(56) References Cited

U.S. PATENT DOCUMENTS

| 4,998,055 A | 3/1991 | Nash et al. |
| 5,153,817 A | 10/1992 | Hosoi et al. |
| 5,200,883 A | 4/1993 | Kobayashi |
| 5,251,105 A | 10/1993 | Kobayashi et al. |
| 5,254,928 A | 10/1993 | Young et al. |
| 5,475,626 A | 12/1995 | Viletto |
| 5,485,073 A | 1/1996 | Kasashima et al. |
| 5,583,744 A | 12/1996 | Oguchi et al. |
| 5,652,502 A | 7/1997 | van Phuoc et al. |
| 5,825,100 A | * 10/1998 | Kim ............................. 307/66 |
| 5,835,989 A | 11/1998 | Nagai |
| 5,886,424 A | 3/1999 | Kim |
| 5,920,728 A | 7/1999 | Hallowell et al. |
| 5,955,797 A | 9/1999 | Kim |
| 6,119,184 A | * 9/2000 | Takahama ................... 710/101 |

* cited by examiner

*Primary Examiner*—Josie Ballato
*Assistant Examiner*—Robert L. Deberadinis

(57) ABSTRACT

The present invention relates to a portable computer having a power supply in the form of a battery pack, the battery pack being both electrically and physically separable from the portable computer. The portable computer has a power management system capable of decreasing power consumption by differentially supplying power according to power management mode, including a base having internally a storage member and provided with at least one opening at one side of the base, a battery pack coupled to the base to supply a power and having at least one lug inserted into the at least one opening, at least one lever coupled to the base and combined or separated with the at least one lug, a switch provided in the base, wherein the switch generates a signal of operating the power management system when the at least one lever is separated from the at least one lug.

26 Claims, 5 Drawing Sheets

| Power management mode | System state |
|---|---|
| Full on mode | Ordinary operation |
| Idle mode | First decrease in CPU clock |
| Standby mode | Second decrease in CPU clock, display off |
| Suspend mode | Interruption of total system power supply after storing system data in hard disk |
| System off | Interruption of system power supply | ps
PORTABLE COMPUTER HAVING POWER SUPPLY SYSTEM PERFORMED BY DETACHMENT OF BATTERY PACK

CLAIM OF PRIORITY

This application makes reference to, incorporates the same herein, and claims all benefits accruing under 35 U.S.C. §119 from an application for Portable Computer Having Power Supply System Performed By Detachment of Battery Pack earlier filed in the Korean Industrial Property Office on the Nov. 30, 1998 and there duly assigned Ser. No. 51980/1998.

FIELD OF THE INVENTION

The present invention relates to a portable, battery-operated computer and, more particularly to a portable computer having a power supply system performed by detachment of battery pack.

DESCRIPTION OF THE RELATED ART

Small, hand-held, battery-operated personal computers have become well known in a variety of applications, particularly in the area of palmtop-type computers also commonly termed personal digital assistants. One example of such a personal digital assistant (PDA), is the popular NEWTON PDA, models 100, 110, and 120, manufactured by Apple Computer, Inc. of Santa Clara, Calif. (referred to herein as the NEWTON). Briefly, the NEWTON PDA is a hand-held, battery-operated electronic device which is capable of being programmed to receive input data, by means of contacting the screen with an electronic pointer or stylus, i.e. PEN based. The screen of the NEWTON PDA is contact sensitive, such that the stylus may be used to create drawings on the screen, enter handwritten notes, or the like, all of which may be stored in the PDA memory for eventual recall. Further, application software may be executed by the PDA, by entering commands, or invoking application sub-functions, through contacting the PDA screen by the stylus or pen, in designated locations defined by the application.

As with other personal digital assistants, application programs are loaded into the NEWTON by means of a PCM-CIA compatible application/memory card, into which the application instruction steps have been coded. Changing an application, is, thus, as simple as removing one PCMCIA card and replacing it with another.

In such a portable computer, a battery pack is provided in the portable computer to supply power without the use of a wire. Generally the power available from batteries is only sufficient to allow operation of the portable computer for a continuous use period of less than about two hours. The battery pack is capable of being attached or detached from a rear side of the portable computer. In such a power supply system that depends on power from the battery pack, a sudden detachment of battery pack from the portable computer may bring about serious damage such as: 1) loss of data, and 2) an occurrence of a system error.

U.S. Pat. No. 5,920,728 for a Dynamic Hibernation Time In A Computer System to Hallowell et al discusses storing hibernation files in a hard disk when a battery pack operated portable computer enters a suspend mode before power interruption. Hallowell et al mentions in the Background of the Invention section that the Intel 486 SL will save data to a hard disk when entering suspend mode, the suspend mode triggered by a period of inactivity of the computer. Hallowell et al seeks to improve upon the Intel 486 SL by saving a hibernation file into a hard disk when the battery capacity drops below a predetermined threshold indicating that exhaustion of battery power is forthcoming. Nevertheless, Hallowell does not discuss storing system data onto a hard disk drive upon detachment of a battery pack from a portable computer.

SUMMARY OF THE INVENTION

It is therefore an object of the present invention to provide a portable computer capable of preventing 1) losses of data and 2) the occurrence of a system error when the battery pack is detached from the portable computer.

It is further an object to place the portable computer in a suspend mode where system data can be stored to a non-volatile memory before power is entirely shut off to the portable computer upon removal of a battery pack from the portable computer.

It is further an object to provide a technique for removing a battery pack from a portable computer whereby mechanical levers on the portable computer are moved between an open and a closed position, causing both an electrical switch to temporarily place the portable computer in a suspend mode allowing for storage of system data into a non-volatile memory and a mechanical separation of the battery pack from the portable computer.

In order to attain the above objects, according to an aspect of the present invention, there is provided a portable computer having a power management system capable of decreasing power consumption by differentially supplying power according to power management mode, including a base having internally a storage means and at least one opening; a battery pack coupled to the base to supply power and having at least one lug inserted into the at least one opening; at least one lever coupled to the base and latching the at least one lug; a switch disposed on the base, wherein the switch generates a signal of operating the power management system when the at least one lever is separated from the at least one lug.

In the present portable computer, wherein operating of the power management system means that the system data are stored in the storage means, then all power supplied in the portable computer is interrupted, wherein the storage means is a non-volatile memory.

According to another aspect of this invention, there is provided a portable computer having a power management system capable of decreasing power consumption by differentially supplying power according to power management mode, including a base provided with a first opening and a second opening and having an internal non-volatile memory; a battery pack coupled to the base to supply a power and having a first lug inserted into the first opening and a second lug inserted into the second opening; a first lever coupled to the base and latching the first lug inserted into the first opening; a second lever coupled to the base and latching the second lug inserted into the second opening; and a switch provided in the base, wherein the switch generates a signal to operate the power management system by a contact of at least one of said first lever and said second lever when one or both of said levers are separated from their respective lugs, wherein the signal indicates that the system data is stored in the non-volatile memory, then all power supplied in the portable computer is interrupted, whereby the system data is stored in the non-volatile memory and all power is completely turned off when the battery pack is detached from the base.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figures 1A, 1B:
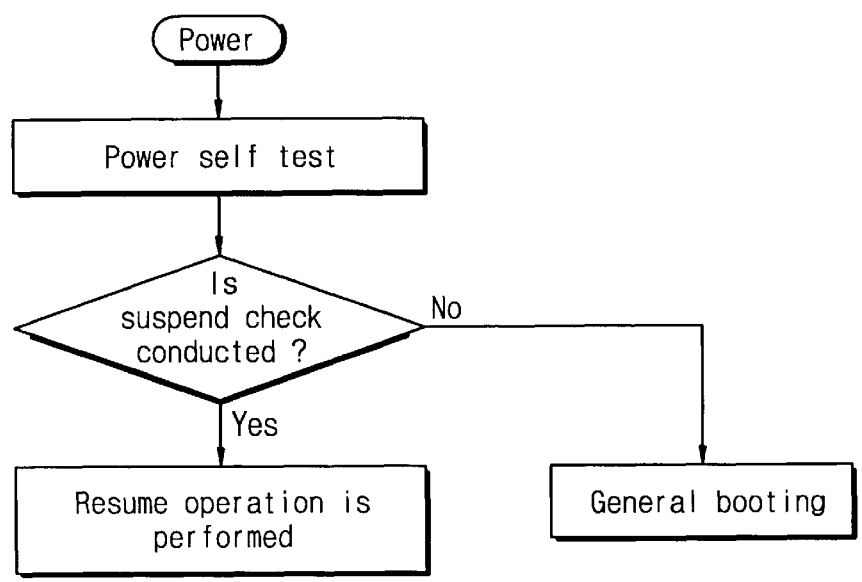
FIG. 1a is a table for illustrating various kind of power management modes in a portable computer.
FIG. 1b is a flow chart for understanding the general booting process.

FIG. 1a is a table for illustrating various kind of power management modes in a portable computer. Referring to FIG. 1a, a general portable computer has various power management modes such as full on mode, idle mode, standby mode, suspend mode and system off. The state of ordinary operation is the full on mode and when no command is inputted for a first predetermined interval of time, power management mode is changed into the idle mode. At the idle mode, the speed of CPU clock is decreased. When no command is inputted for a second predetermined interval of time at the idle mode, the power management mode is changed into the standby mode. At the standby mode, the speed of CPU clock is more decreased and a video signal transmitted to a display device is interrupted and a power transmitted to the display device is interrupted. Nevertheless, if any external command is inputted at the standby mode, the power management mode is changed into the full on mode. Furthermore, the power management mode is changed into the suspend mode if no external command is inputted for a third predetermined interval of time. At the suspend mode, all information of system data are stored in a non-volatile memory such as a hard disk or flash memory, then all power supplying the portable computer is turned off, with the exception of power being continuously supplied to PMS (power management system) which functions the power management. At the suspend mode, the user of the portable computer will have to operate a power switch to alert the power management system to bring the portable computer into the full on mode. The resume operation is executed by the operation of the power switch while in the suspend mode. If the resume operation is executed, all stored information of system data and surroundings of the system are restored to the original state. Compared to the suspend mode, the power switch is operated at the system off mode, a general booting is executed without the resume operation.

A suspend check shown in the flow chart of FIG. 1b determines whether the power mode of the computer is in suspend mode or not before power is cut off. If the suspend check is conducted, resume operation is performed and if suspend check is not conducted, general booting is performed. Therefore, resume and booting are not able to occur at the same time.

Figure 2:
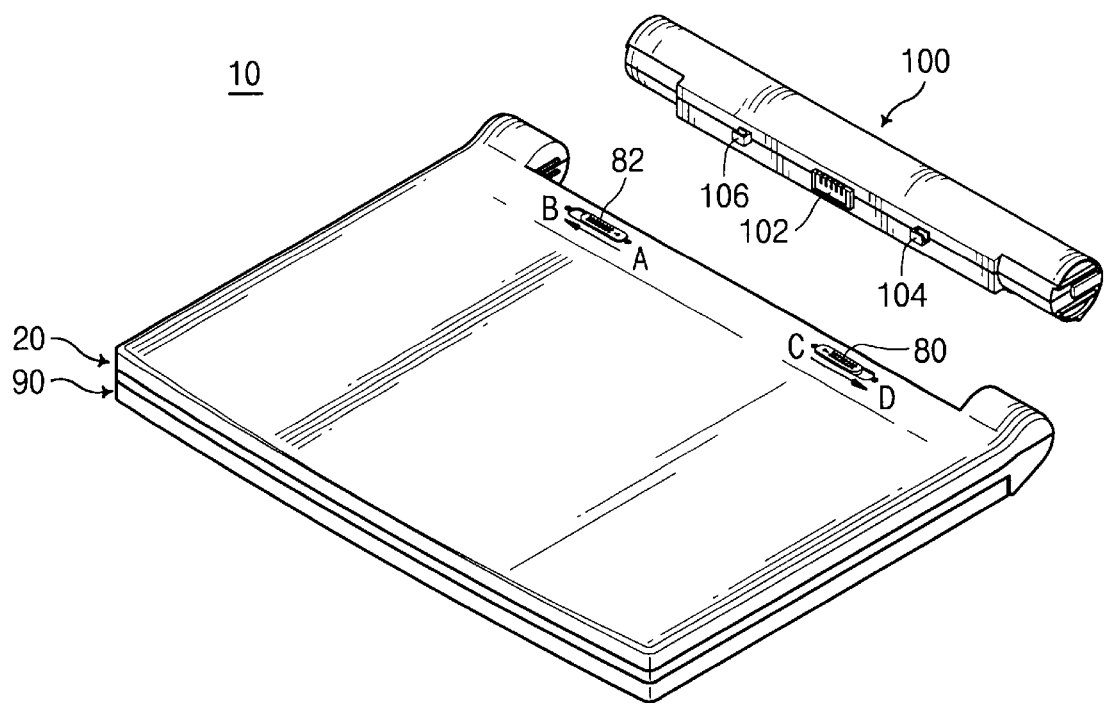
FIG. 2 is a perspective view showing a battery pack and the bottom view of a portable computer when the battery pack is detached from the portable computer according to the principles of the present invention.
Figure 3:
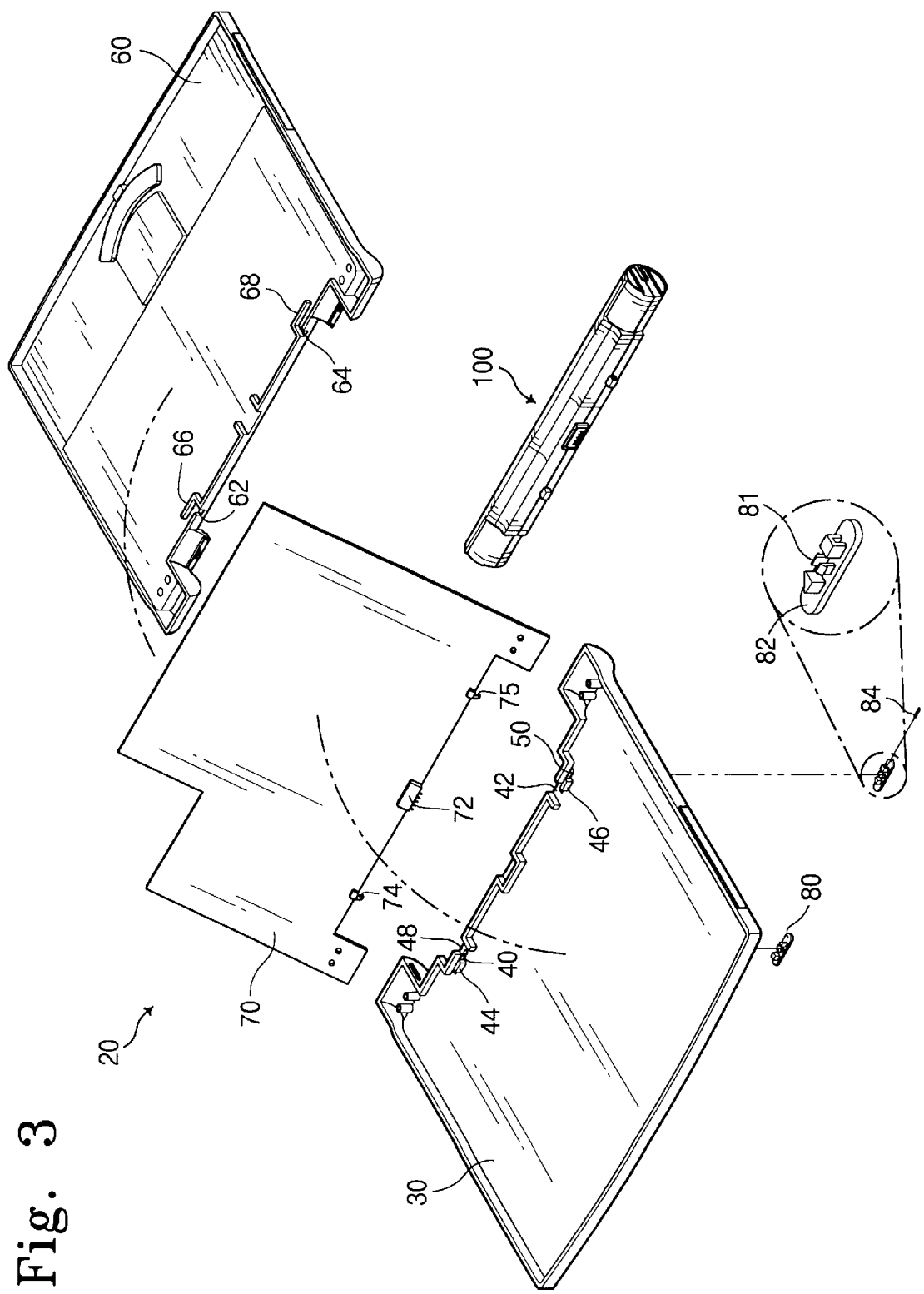
FIG. 3 is an exploded perspective view for illustrating a base of a portable computer including a lower housing and a upper housing and a printed circuit board.
Figure 4:
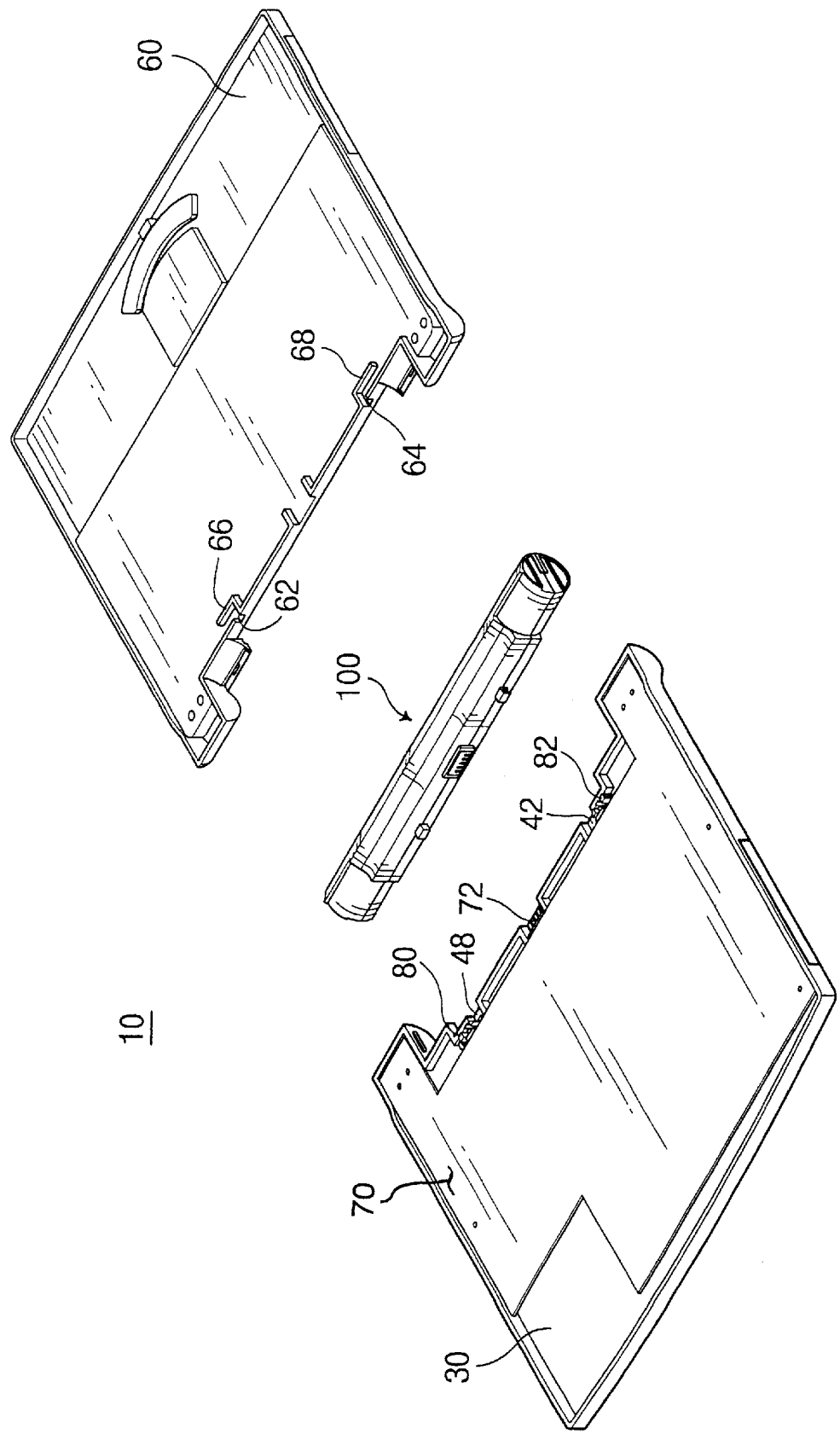
FIG. 4 is an exploded perspective view for illustrating a base of a portable computer wherein the printed circuit board is stored in the lower housing.

FIG. 2 is a perspective view showing a battery pack along side a bottom view of the portable computer when the battery pack is detached from the portable computer according to the present invention, FIG. 3 is an exploded perspective view for illustrating a base 20 of a portable computer 10 having a lower housing 30, an upper housing 60, and a printed circuit board 70 and FIG. 4 is an exploded perspective view for illustrating a base of a portable computer wherein the printed circuit board 70 is inserted into lower housing 30.

Referring to FIG. 2 through 4, the portable computer 10 according to the present invention includes a lower housing 30, an upper housing 60, a circuit board 70 and display panel 90. As shown in FIG. 3, the lower housing 30 is coupled to the upper housing 60 to form the internal space. The circuit board 70 or the other electric device is disposed between the lower housing 30 and the upper housing 60. A total portion comprising the lower housing 30 and the upper housing 60 is called a base 20 (referring to FIG. 2) of the portable computer 10. The display panel 90 is attached pivotally to the base 20 via the hinge portion (not shown). The display panel 90 incorporates the display screen such as LCD (liquid crystal display).

The present inventive embodiment of portable computer 10 is designed to use the battery pack 100 to supply power to portable computer 10. The battery pack may be a rechargeable battery or a battery type using the ordinary battery. The battery pack 100 coupled to the base 20 includes an electrical connector 102 and lugs 104, 106 shown in FIG. 2. The electrical connector 102 is coupled to electrical connector 72 of the circuit board 70. Two holes 40, 42 are formed at the rear side of the lower housing 30, and two holes 62, 64 are formed at the rear side of the upper housing 60 corresponding to holes 40, 42. When the upper housing 60 and the lower housing 30 is combined, two openings are formed by holes 40, 42, 62, 64. A first opening is formed by hole 40 mating with hole 62 and a second opening is formed by hole 42 mating with hole 64. The battery pack 100 is coupled to the base 20, and the lug 104 is inserted into the first opening formed by holes 40, 62 and the lug 106 is inserted into the second opening formed by holes 42, 64.

Two openings 48, 50 is formed on a bottom surface of the lower housing 30 to couple to two levers 80, 82. The first lever 80 is coupled to the opening 48, and the second lever 82 is coupled to the opening 50. Each of the first lever 80 and the second lever 82 has a hook 81, which is capable of moving horizontally within the opening. On the bottom surface of the lower housing 30, ribs 44, 46 are formed and ribs 66, 68 are formed on the surface of the upper housing 60 corresponding to the ribs 44, 46.

The battery pack 100 is coupled to the base 20, then the lugs 104, 106 are inserted into the opening and locked by levers 80, 82. For example, the lug 106 is inserted into the opening formed by the holes 42, 64, then the lug 106 is locked by the second lever 82.

A switch 74 is disposed at the circuit board 70. In one embodiment, switch 74 is contacted with the first lever 80 when the first lever 80 is moved at one horizontal direction to detach the battery pack 100 from the base 20. The contacted switch 74 produces a signal which executes the function of the suspend mode. In the present inventive embodiment, when the battery pack 100 is detached from the combination of the upper and lower housing, the power management system of the portable computer 10 is operated to save the system data in non-volatile memory of the storage device, and then interrupt the power of the system device. After these operations, the battery pack 100 is detached from the portable computer 10.

Figure 5:
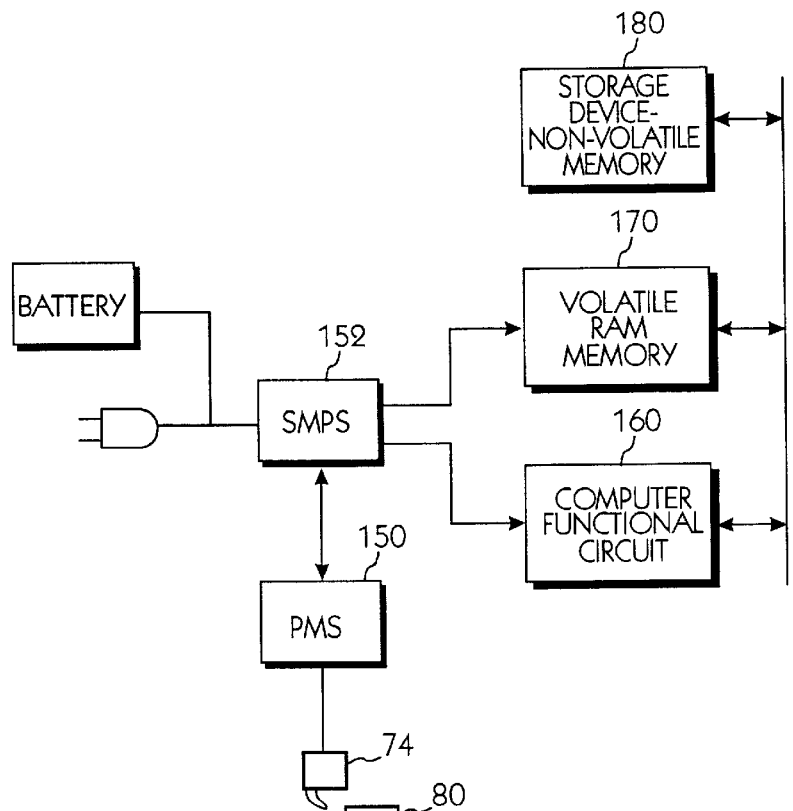
FIG. 5 is a diagram for illustrating the first embodiment of the present invention showing how to control a system in such a case of detaching the battery pack from the portable computer.
Figure 6:
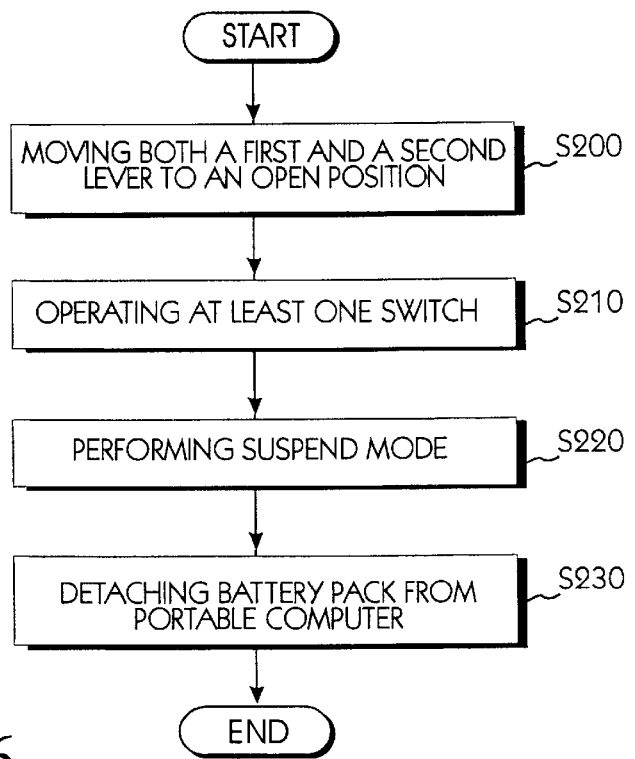
FIG. 6 is a flowchart for illustrating how to control a system in such a case of detaching the battery pack from the portable computer according to the principles of the present invention.

FIG. 5 is a diagram for illustrating how to control a system in such a case of detaching the battery pack from the portable computer according to the present invention and FIG. 6 is a flowchart for illustrating how to control a system in such a case of detaching the battery pack from the portable computer according to the present invention.

Referring to FIG. 5 and FIG. 6, the present inventive portable computer 10 executes the power management as the suspend mode when the battery pack 100 is detached from the combination of the lower and upper housing. The portable computer 10 has PMS (power management system) 150 and SMPS (switching mode power supply) 152. The SMPS 152 supplies power to the individual system to operate the power management system 150, and the PMS 150 controls the SMPS 152. When power is supplied from an AC adapter or a battery to SMPS 152, SMPS 152 sends out a signal to PMS 150 indicating a status that power is sufficient. The SMPS 152 then receives a signal from PMS 150 and supplies power to computer functional circuit 160, RAM 170, and non-volatile memory 180. Computer functional circuit 160 is connected to SMPS 152 and is a general circuit element of the computer, for example, a central processing unit.

The suspend mode is executed by two steps: 1) all information of system such as system data and setting state of system is stored in volatile RAM memory 170, and 2) system data stored at the memory 170 written into storage device 180 being a non-volatile memory such as hard disk or flash memory. To detach the battery pack 100, the first lever 80 and the second lever 82 are moved to the open position (S200). According to the first embodiment, during the moving of the first lever 80 from the closed position 'A' to the to the open position 'B', the first lever 80 contacts and activates switch 74 (S210). The contacted switch 74 generates a signal to be transmitted the PMS 150. Then the PMS 150 controls the SMPS 152 to execute the suspend mode (S220). The suspend mode is executed and system data is stored in memory 170 and then stored into non-volatile memory 180 before power to the system is interrupted. When data is finally stored in non-volatile memory 180, PMS 150 receives a responsive signal, and PMS 150 sends a signal to SMPS 152 where SMPS 152 in turn stops supplying power to RAM 170, non-volatile memory 180, and computer functional circuit 160. Then, the battery pack may be detached (S230).

Other embodiments to the present invention include a switch 75 that contacts lever 82 when lever 82 is moved from the closed position 'C' to the open position 'D', switch 75 is activated and generates a signal that is sent to the PMS 150 to control the SMPS 152 to initiate suspend mode. Also, when lever 80 is moved from the closed position 'A' to the open position 'B' simultaneously with the movement of lever 82, battery 100 can then be electrically and physically detached from personal computer 10 as lugs 104, 106 are removed from first opening and second opening of portable computer 10 formed by holes 40, 62 and 42, 64, respectively, and electrical connector 102 of battery 100 is detached from electrical connector 72 of printed circuit board 70 of portable computer 10.

In yet another embodiment, a signal is sent to PMS 150 to control SMPS 152 to execute suspend mode only when both switches 74 and 75 are activated by moving both levers 80 and 82 simultaneously from position 'A' to 'B' and from position 'C' to 'D' respectively. In either case, the SMPS provides the power during battery 100 detachment to store system data into volatileRAM 170 and then into non-volatile memory 180 before interruption of total system power supply.

In the accordance with the embodiment of the present invention, the portable computer is possible to preventing losses of system data and system error when the battery pack is detached from the portable computer.

It will be apparent to those skilled in the art that various modifications can be made in the method for improving printing quality of the present invention, without departing from the spirit of the invention. Thus, it is intended that the present invention cover such modifications as well as variations thereof, within the scope of the appended claims and their equivalents.

What is claimed is:

1. A portable computer, comprising:
   a base having internally a storage means and a first opening;
   a battery pack coupled to said base to supply power and having a first lug inserted into said first opening;
   a first lever coupled to said base and latching said first lug; and
   a switch provided in said base, wherein the switch generates a signal to operate a power management system capable of adjusting power consumption of said portable computer by switching to a suspend mode when said first lever is separated from said first lug to allow for storing system data into a non-volatile memory prior to switching to a system off mode where total interruption of all power supplied to said portable computer caused by a removal of said battery pack from said computer.

2. The portable computer of claim 1, said base further comprising a second opening, said battery pack further comprising a second lug insertable into said second opening, and a second lever coupled to said base and latching said second lug, wherein said battery pack decouples from said base when both said first lever and said second lever simultaneously become separated from said first and said second lug respectively.

3. The portable computer of claim 2, further comprising a switching mode power supply that works in conjunction with said power management system to provide power to store said system data into said non-volatile memory before power is interrupted to said portable computer.

4. The portable computer of claim 1, said non-volatile memory being a hard disk.

5. The portable computer of claim 4, further comprising a random access memory to store said system data temporarily prior to said storage of said system data in said non-volatile memory on said hard disk.

6. The portable computer of claim 1, wherein said system data is stored into a volatile memory prior to storage of said system data into a non-volatile memory upon removal of said battery pack from said portable computer.

7. A portable computer, comprising:
   a base provided with a first opening and a second opening and having internally non-volatile memory;
   a battery pack coupled to the base and being the sole supply of power to said portable computer, said battery pack having a first lug inserted into the first opening and a second lug inserted into the second opening;

a first lever capable of being coupled to or separated from said first lug inserted into said first opening;

a second lever coupled to said base and latching said second lug inserted into said second opening; and a first electronic switch provided in said base, said first electronic switch capable of enabling a power management system and a switching mode power supply stored within said base of said portable computer to store system data onto said non-volatile memory upon disassembly of said battery pack from said base of said portable computer.

8. The portable computer of claim 7, said base comprising an upper housing, a lower housing, and a printed circuit board disposed between said upper housing and said lower housing, said printed circuit board having an electrical connector that electrically connects said base to said battery pack.

9. The portable computer of claim 8, said battery pack further comprising an electrical connector that mates with said electrical connector of said printed circuit board to electrically connect said battery pack to said base of said portable computer.

10. The portable computer of claim 9, the first opening and the second opening are provided with the lower housing, whereby the first lever and the second lever are coupled to the lower housing.

11. The portable computer of claim 10, the first electronic switch is provided in the printed circuit board.

12. The portable computer of claim 11, said first switch enabling said power management system and said switching mode power supply when said first lever becomes separated from said first lug.

13. The portable computer of claim 12, said battery pack becoming decoupled from said base when both said first lever becomes separated from said first lug simultaneous to said second lever becoming separated from said second lug.

14. The portable computer of claim 11, said first switch enabling said power management system and said switching mode power supply when said second lever becomes separated from said second lug.

15. The portable computer of claim 11, further comprising a second switch located in operational relationship to said second lever while said first switch is in operational relationship to said first lever, said first switch and said second switch enabling said power management system and said switching mode power supply when both said first lever becomes separated from said first lug simultaneous to said second lever becoming separated from said second lug, activating simultaneously said first switch and said second switch.

16. A method for separating a battery pack from a base of a portable computer, comprising the steps of:

sliding simultaneously a pair of levers apart from each other, said pair of levers located on said base of said portable computer;

activating a switch physically connected to one of said pair of levers to send out an electrical signal activating a power management system and a switching mode power supply located in said base of said portable computer;

storing system data into a non-volatile memory;

interrupting a power supply to said portable computer; and detaching said battery pack from said base of said portable computer.

17. The method of claim 16, further comprising the step of storing said system data into a random access memory prior to storing said system data into said non-volatile memory.

18. The method of claim 17, wherein said non-volatile memory is a hard disk.

19. The method of claim 16, wherein said step of detaching said battery pack from said base of said portable computer further comprises the step of electronically detaching said battery pack from said base of said portable computer by separating a pair of electrical connectors.

20. A portable computer, comprising:

a base comprising a volatile memory and a non-volatile memory;

a battery pack attached to said base and providing an only source of power for said portable computer, said battery pack being mechanically and electrically attachable and detachable from said base of said portable computer;

an electronic switch that is activated during detachment of said battery pack from said base of said portable computer; and a power management system adjusting an amount of power delivered to said portable computer, said power management system being activated by said electronic switch, wherein upon electrical and mechanical detachment of said battery pack from said computer system, said power management system insures that system data for said portable computer is stored in said non-volatile memory prior to total interruption of power.

21. The portable computer of claim 20, said base further comprising a pair of openings and said battery pack further comprising a pair of lugs, each of which are insertable and removable from respective ones of said pair of openings via user manipulation of a pair of levers to allow for detachment or attachment of said battery pack from said base.

22. The portable computer of claim 21, further comprising a second electronic switch that is activated during detachment of said battery pack from said base of said portable computer, each lever actuating respective ones of said electronic switches resulting in said power management switch adjusting the amount of power delivered to said portable computer upon actuation of both electronic switches.

23. The portable computer of claim 21, further comprising a second electronic switch that is activated during detachment of said battery pack from said base of said portable computer, each lever actuating respective ones of said electronic switches resulting in said power management switch adjusting the amount of power delivered to said portable computer upon actuation either electronic switch.

24. The portable computer of claim 20, wherein said base further comprises a hole and said battery pack further comprises a lug insertable and removable from said hole in said base via user manipulation of a lever, wherein operation of said lever actuates said electronic switch.

25. The portable computer of claim 20, said portable computer further comprising a switching mode power supply that works in conjunction with said power management system to control the amount of power delivered to said portable computer during detachment of said battery pack from said base.

26. The portable computer of claim 25, said system data is first stored in said volatile memory prior to storing in said non-volatile memory upon said interruption of power.

* * * * *